United States Patent [19]

Engle

[11] Patent Number: 5,159,312

[45] Date of Patent: Oct. 27, 1992

[54] DOUBLE SWITCH SAFETY SYSTEM AND SIGNALING DEVICE FOR A TRAILER HITCH COUPLING

[76] Inventor: Edgar R. Engle, 26 Scrafford St., Shippensburg, Pa. 17527

[21] Appl. No.: 678,442

[22] Filed: Apr. 1, 1991

[51] Int. Cl.⁵ .............................................. G08B 21/00
[52] U.S. Cl. ...................................... 340/431; 340/686; 340/687; 307/9.1
[58] Field of Search ............... 340/431, 686, 687, 522; 307/91.10.1; 280/432

[56] References Cited

U.S. PATENT DOCUMENTS

| 4,593,264 | 6/1986 | Engle | 340/687 |
| 4,988,116 | 1/1991 | Evertsen | 340/687 |

Primary Examiner—Donnie L. Crosland
Attorney, Agent, or Firm—Aquilino & Welsh

[57] ABSTRACT

A trailer hitch alarm system having a double safety switch for a ball and socket coupling in combination with an alarm system to provide an alarm signal indication that the socket has become loose from the ball or that the ball has become loose from the towing vehicle frame.

7 Claims, 2 Drawing Sheets

DOUBLE SWITCH SAFETY SYSTEM AND SIGNALING DEVICE FOR A TRAILER HITCH COUPLING

BACKGROUND AND SUMMARY OF THE INVENTION

The present invention relates to a double switch, automatic warning system for trailer hitches and, in particular, to a novel trailer hitch ball structure providing an indication of a faulty coupling or unauthorized removal of the hitch from the trailer.

Trailers hitched to towing vehicles conventionally use a ball and socket hitch type arrangement. The ball is included as part of an automotive hitch mount secured to the rear bumper or frame of the vehicle, and cooperates with a socket coupling member attached to the trailer. A properly designed coupling will permit the trailer to be maneuvered by the towing vehicle while maintaining a tight connection between the ball and socket using a latch mechanism, which in a locking position, prevents uncoupling of the socket member from the ball member when the trailer is being towed.

However, many conventional coupling devices presently in use on the highways present a potential hazard because of the tendency of the socket to become loose from the ball due to improper coupling, rough traveling conditions, or wear and tear on the connection. Failure of the coupling will result in accidents which cause personal property damage and other severe injury. Normally the driver of the vehicle is unaware that the coupling is loose until the coupling is loose until the coupling actually separates. A further shortcoming of the prior art permits unauthorized uncoupling of the trailer hitch resulting in loss of property without suitable safeguards or warnings.

Various attempts have been made to provide safety features and warning devices for vehicles which are hitched using a ball and socket type coupling including a number of patents which provide either visual or audible warnings when a coupling becomes loose. Prior art patents relating to this type of arrangement are described in applicant's own patent (4,593,264) as well as U.S. Pat. Nos. to Quillici et al. (3,710,270) and Gehman et al. (4,627,633), among others.

The present invention provides a double switch safety system for a ball and socket type trailer coupling which uses a first switch in the top of the ball which will provide an indication that the socket has become loose or has been removed from the ball, and a second switch in the base of the ball which will become actuated if the nut which holds the ball onto the towing vehicle frame structure becomes loose.

Among the objects of the present invention are to provide a warning system for ball and socket type trailer hitches which will provide a signal to the towing vehicle driver when the ball and socket coupling becomes loose or when the ball bends or otherwise separates from the towing vehicle frame to permit the driver to slow down and stop the vehicle before an actual separation of the coupling takes place.

Another object is to provide a trailer hitch coupling which provides a warning if the hitch is removed without authorization.

These and other objects of the invention will become apparent with reference to the following drawings and specifications.

DESCRIPTION OF THE PREFERRED EMBODIMENTS

Figure 1:
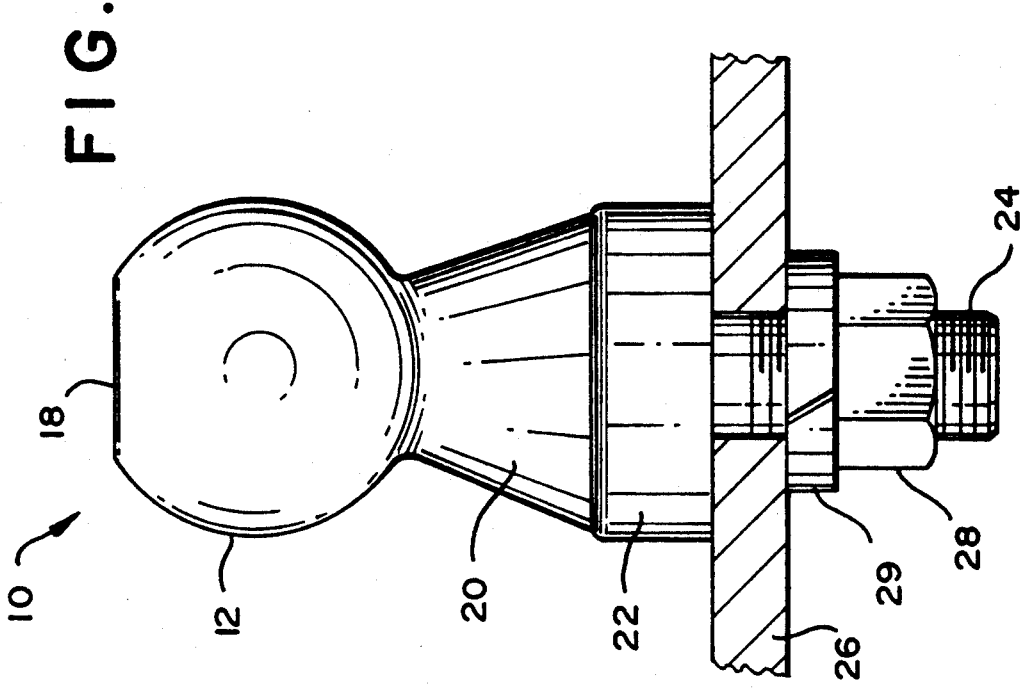
FIG. 1 shows a ball and socket arrangement including the dual safety switch system of the present invention.
Figure 3:
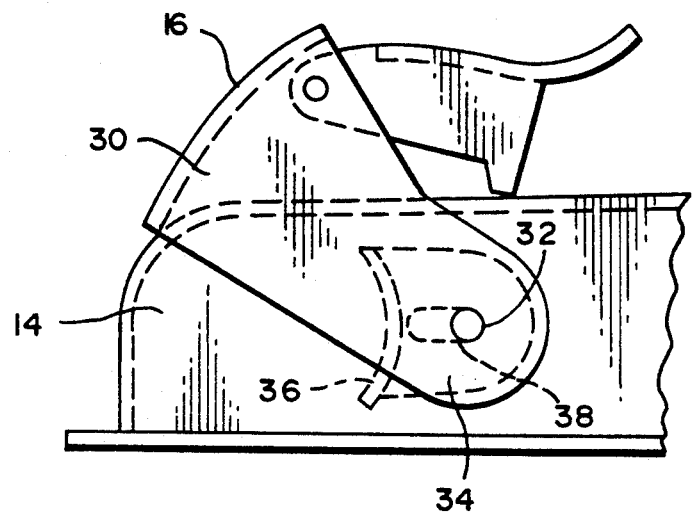
FIG. 3 shows a socket and latching arrangement.

The drawings show the trailer hitch warning system of the present invention which uses a double switch safety system to provide the driver of a towing vehicle an audible or visual indication if the coupling becomes loose. Referring to FIGS. 1 and 3, a trailer hitch 10 includes a ball member 12 and a socket member 14 and latch mechanism 16. The ball 12 includes a flat upper surface 18, a pedestal 20 and a base 22. The lower portion of the ball includes a threaded shank 24 which fits though a suitable hole in the vehicle frame 26 and is secured by a nut 28 which includes a suitable locking means 29. The ball 12 is mounted in a vertical and upright position with respect to the frame 26. The socket 14 opens downwardly and is adapted to fit over the top portion of the ball 12. After the socket is properly seated on the ball 12, it can be securely coupled using the latching mechanism 16.

The latching structure, as shown in FIG. 3, is of conventional design, and includes a lever 30 mounted on the exterior of the socket 14 and pivotally coupled thereon using pins 32 which extend through slots 34 in opposite sides of the socket 14. A slider 34 includes a gripping surface 36 which conforms to the configuration of the ball to capture it when the latching mechanism is closed by pivoting it downwardly across the outside of the socket 14.

Figure 2:
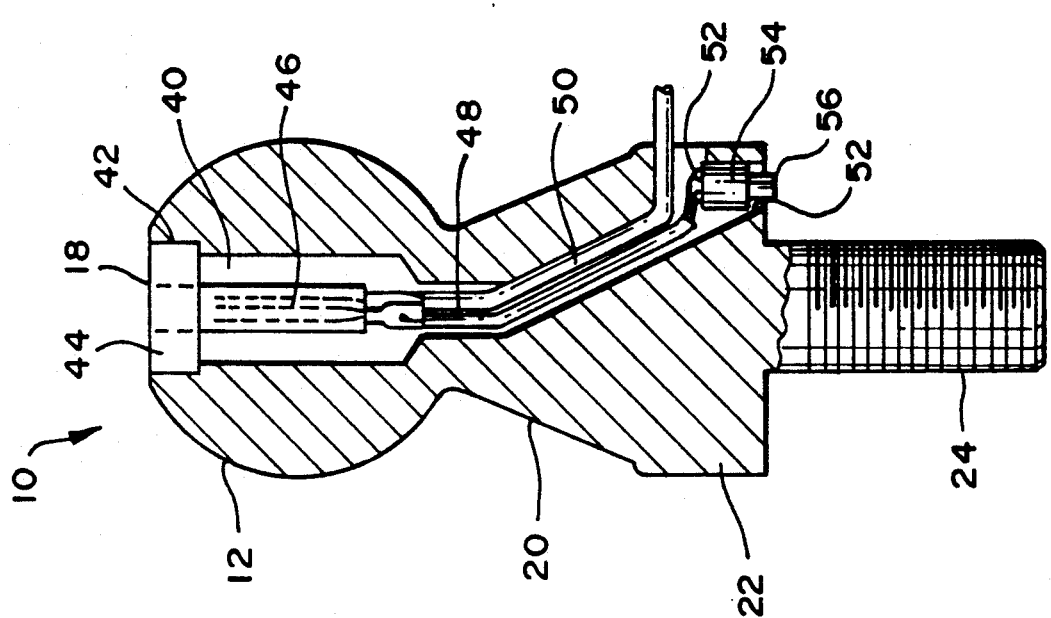
FIG. 2 shows a sectional view of the ball of FIG. 1.

Referring to FIG. 2, the ball 12 is shown partially in section, and includes a chamber in the form of a bore 40 centrally positioned with respect to the longitudinal axis of the ball, and opening upwardly. The bore 40 includes an upper annular ledge 42 which accommodates a toroidal magnet 44 including a bore which mounts a reed type socket sensor switch 46. The socket sensor switch 46 is designed to be actuated, either in a normally opened or normally closed position, in accordance with the presence or absence of ferro-magnetic material adjacent the magnet.

When the trailer hitch socket 14 is properly seated on the ball 12, the ferromagnetic material of the socket coupling changes the strength of magnetic path through the magnet 44 and actuates the socket sensor switch 46, for example, into an open position. When the socket of the trailer hitch coupling 10 is separated from the ball, either by being loose or by being removed, the magnetic circuit is weakened and the normally open sensor switch 46 closes.

The sensor switch 46 is connected by suitable wiring 48 within the bore 40 which extends through the pedestal 20 of the ball 12 to a remote transmitter as described hereinbelow.

The base 22 of the ball 12 is provided with a second chamber opening 52 to accommodate a frame sensor switch 54 which preferably is a conventional microswitch. The frame sensor microswitch 54 includes a plunger 56 which is used to actuate the switch. The frame sensor microswitch 54 is positioned within the opening 52 so that the plunger extends beyond the edge of the base 22 of the ball 12 so that when the ball is properly installed on the frame 26 of the towing vehicle, the plunger abuts the frame which depresses the plunger 56 and deactuates the switch. If the ball becomes loosened with respect to the frame 26, the plunger 56 is then released, which actuates the frame sensor switch 54 due to the separation of the ball 12 from the frame 26.

Figure 4:
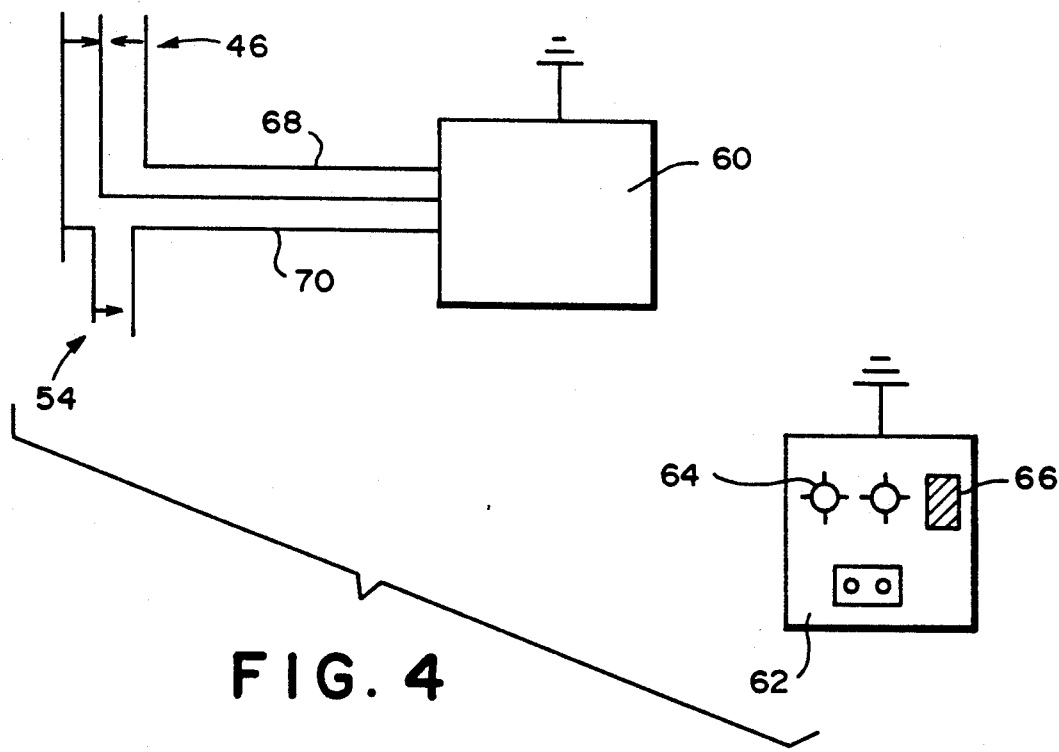
FIG. 4 shows a schematic circuit diagram of an alarm circuit suitable for use with the present invention.

A variety of electrical circuits may be used to provide an alarm indication when either the socket sensor switch or frame sensor switch becomes actuated. Depending upon the particular circuit used, it will be appreciated that these switches may be kept in a normally opened or normally closed position. An example of a schematic circuit which could be used with the present invention is shown in FIG. 4. A ball 12, shown in phantom lines, includes a socket switch 46 and a frame switch 54 as described hereinabove.

The switches 46 and 54 are each connected to an alarm transmitter 60 capable of sending an RF signal to a remote receiver 62 when either of the switches are actuated. The receiver 62 may be located within the cab of the towing vehicle or may be located at a remote location, for example in the office or home of the owner of the trailer. It will be appreciated the transmitter includes a suitable power supply and RF generating circuitry suitable for the purpose.

Referring to the diagram, the switches 46 and 54 are shown in the normal positions with the trailer hitch latching mechanism 16 properly latched and secured and with the ball 12 tightly secured to the draw bar frame 26. If the latching mechanism 16 becomes loose during a towing operation or is completely removed by unauthorized personnel when the alarm transmitter is activated, the switch 46 is closed completing a circuit loop 68 to the transmitter 60 which in turn sends an RF alarm signal which is picked up by the remote receiver 62 which, in turn, activates a visual alarm 64 and/or an audio alarm 66. Similarly, if the socket 12 becomes loose from the draw bar frame 26, the microswitch 54 is closed and a second circuit loop 70 is closed completing a circuit to the transmitter 60 to send the RF alarm signal.

It will be appreciated that the double switch arrangement may be hard wired directly to an alarm device mounted in the cab of the towing vehicle rather than to the transmitter if the remote alarm feature is not required.

It will be appreciated that other types of switches may be used in place of the reed and microswitch described hereinabove. Still other modifications may be made in keeping within the spirit and scope of the present invention as defined in the following claims:

I claim:

1. A trailer hitch alarm system for use with a ball and socket type trailer hitch coupling providing an alarm indication upon separation of the ball and socket or upon separation of the ball from the towing vehicle frame, comprising;
   an alarm circuit, including an alarm indicator means, for providing an indication of a fault condition;
   a first switch means in said circuit located on the top of said ball having an actuating means adjacent said socket and being capable of being actuated upon separation of said socket from said ball; and,
   a second switch means in said circuit located on the bottom of said ball having an actuating means adjacent said towing vehicle frame and capable of being actuated upon separation of said ball from said frame; whereby actuation of either said first switch means or said second switch means actuates the alarm circuit and provides the indication of the fault.

2. The alarm system of claim 1, wherein said ball member includes a hollow chamber and said first switch means is a magnetic reed switch positioned in said hollow chamber adjacent said top of said ball and in ferromagnetic communication with said socket when said socket is in placed on said ball.

3. The alarm system of claim 2, wherein said ball member further includes a second chamber opening in the bottom thereof for said second switch means including an actuator extending out of said second chamber opening and abutting against said towed vehicle frame.

4. The alarm system of claim 3, wherein said second switch means is a microswitch.

5. The alarm system of claim 1, wherein said first and second switch means are each connected in a circuit loop with said alarm indicator means whereby actuation of either of said first or second switch means provides an alarm indication.

6. The trailer hitch alarm system of claim 1 further including a transmitter for transmitting an RF alarm signal to a remote location and a receiver for receiving said signal and providing an alarm indication thereof.

7. A trailer hitch alarm system for use with a ball and socket type trailer hitch coupling including a ball mounted on a vehicle frame and a socket mounted on a towed vehicle for providing an alarm indication in response to a faulty condition, comprising:
   a dual alarm circuit including a first circuit loop having a first switch means actuated in response to the separation of said ball and socket of said trailer hitch coupling; and a second circuit loop having a second switch means actuated in response to the separation of said ball from said vehicle frame; and
   alarm indication means for providing an indication of an alarm condition in response to actuation of said first or said second switch means.

* * * * *